United States Patent
Gupta et al.

(10) Patent No.: US 9,763,220 B2
(45) Date of Patent: Sep. 12, 2017

(54) CORRELATING ROAD NETWORK INFORMATION AND USER MOBILITY INFORMATION FOR WIRELESS COMMUNICATION NETWORK PLANNING

(71) Applicant: International Business Machines Corporation, Armonk, NY (US)

(72) Inventors: Parul Gupta, Bangalore Karnataka (IN); Shivkumar Kalyanaraman, Vibhutipura (IN); Ravindranath Kokku, Hyderabad (IN); Vinay Kumar Kolar, Bangalore (IN); Kang-Won Lee, Nanuet, NY (US); Dinesh Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 15/232,950

(22) Filed: Aug. 10, 2016

(65) Prior Publication Data

US 2016/0353404 A1  Dec. 1, 2016

Related U.S. Application Data

(63) Continuation of application No. 14/258,676, filed on Apr. 22, 2014, now Pat. No. 9,456,312.

(51) Int. Cl.
*H04W 64/00* (2009.01)
*H04W 8/02* (2009.01)
(Continued)

(52) U.S. Cl.
CPC .......... *H04W 64/006* (2013.01); *H04L 41/14* (2013.01); *H04L 43/065* (2013.01);
(Continued)

(58) Field of Classification Search
CPC ..... H04W 64/006; H04W 4/021; H04W 8/02; H04W 16/18; H04W 24/10; H04W 4/04;
(Continued)

(56) References Cited

U.S. PATENT DOCUMENTS

| 5,561,841 A | 10/1996 | Markus |
| 5,920,607 A | 7/1999 | Berg |

(Continued)

FOREIGN PATENT DOCUMENTS

| EP | 1303121 A1 | 4/2003 |
| EP | 1465446 | 10/2004 |

(Continued)

OTHER PUBLICATIONS

Notice of Allowance dated Jun. 14, 2016, received for U.S. Appl. No. 14/258,676.

(Continued)

*Primary Examiner* — Brandon Miller
(74) *Attorney, Agent, or Firm* — Fleit Gibbons Gutman Bongini Bianco PL; Thomas S. Grzesik

(57) ABSTRACT

Various embodiments monitor user mobility in a wireless communication network. In one embodiment, a set of temporally related call detail records associated with at least one user of a wireless communication network is analyzed. A set of base stations accessed during at least one call associated with the set of temporally related call detail records is identified based on the analysis of the records. At least one road segment of a road network within a threshold distance to each of the set of base stations is identified. A set of mobility information for the at least one user indicating that the at least one user traversed the at least one road segment is stored based on identifying the at least one road segment.

17 Claims, 10 Drawing Sheets

(51) Int. Cl.

| | | |
|---|---|---|
| *H04M 3/22* | (2006.01) | |
| *H04W 4/02* | (2009.01) | |
| *H04L 12/26* | (2006.01) | |
| *H04M 15/00* | (2006.01) | |
| *H04L 12/24* | (2006.01) | |
| *H04W 16/18* | (2009.01) | |
| *H04W 24/10* | (2009.01) | |
| *H04W 4/04* | (2009.01) | |
| *H04W 88/02* | (2009.01) | |
| *H04W 88/08* | (2009.01) | |

(52) U.S. Cl.
CPC ......... *H04M 3/2218* (2013.01); *H04M 15/41* (2013.01); *H04M 15/58* (2013.01); *H04W 4/021* (2013.01); *H04W 4/04* (2013.01); *H04W 8/02* (2013.01); *H04W 16/18* (2013.01); *H04W 24/10* (2013.01); *H04W 88/02* (2013.01); *H04W 88/08* (2013.01)

(58) Field of Classification Search
CPC ...... H04W 88/02; H04W 88/08; H04L 41/14; H04L 43/065; H04M 3/2218; H04M 15/41; H04M 15/58
See application file for complete search history.

(56) References Cited

U.S. PATENT DOCUMENTS

| | | | |
|---|---|---|---|
| 6,298,123 B1 | 10/2001 | Nolting et al. | |
| 6,317,599 B1 | 11/2001 | Rappaport et al. | |
| 6,336,035 B1 | 1/2002 | Somoza et al. | |
| 6,970,542 B2 | 11/2005 | Moisey et al. | |
| 6,985,731 B1 | 1/2006 | Johnson et al. | |
| 7,043,661 B2 | 5/2006 | Valadarsky et al. | |
| 7,246,045 B1 | 7/2007 | Rappaport et al. | |
| 7,475,003 B1 | 1/2009 | Madhusudhana et al. | |
| 7,555,261 B2 | 6/2009 | O'Neill | |
| 7,609,826 B2 | 10/2009 | Liu et al. | |
| 8,131,300 B2 | 3/2012 | Sartori et al. | |
| 8,135,414 B2 | 3/2012 | Khokhar | |
| 8,229,163 B2 | 7/2012 | Coleman et al. | |
| 8,369,230 B1 | 2/2013 | Croak et al. | |
| 8,391,836 B1 | 3/2013 | Bolot et al. | |
| 8,406,398 B2 | 3/2013 | Gore | |
| 8,634,527 B2 | 1/2014 | Chung et al. | |
| 8,861,691 B1 | 10/2014 | De et al. | |
| 9,350,670 B2* | 5/2016 | Ko | H04W 40/24 |
| 9,456,312 B2* | 9/2016 | Gupta | H04W 4/04 |
| 9,497,648 B2* | 11/2016 | Gupta | H04M 3/085 |
| 9,503,329 B2* | 11/2016 | Gupta | H04W 4/04 |
| 2002/0083166 A1 | 6/2002 | Dugan et al. | |
| 2002/0107634 A1* | 8/2002 | Luciani | G08G 1/0104 |
| | | | 701/117 |
| 2005/0107095 A1 | 5/2005 | Samuel | |
| 2005/0262106 A1 | 11/2005 | Enqvist | |
| 2006/0141983 A1 | 6/2006 | Jagannathan et al. | |
| 2006/0274703 A1 | 12/2006 | Connelly | |
| 2006/0293025 A1 | 12/2006 | Chiou et al. | |
| 2007/0035390 A1 | 2/2007 | Thomas et al. | |
| 2007/0153807 A1 | 7/2007 | Cruz et al. | |
| 2007/0191010 A1 | 8/2007 | Kim et al. | |
| 2008/0019493 A1 | 1/2008 | Kreckel et al. | |
| 2008/0046306 A1 | 2/2008 | Egner et al. | |
| 2008/0288427 A1 | 11/2008 | Barson et al. | |
| 2009/0067423 A1 | 3/2009 | Visser | |
| 2009/0207741 A1 | 8/2009 | Takahashi | |
| 2009/0304165 A1 | 12/2009 | Chung et al. | |
| 2009/0318132 A1 | 12/2009 | Chiou et al. | |
| 2010/0135476 A1 | 6/2010 | Paden et al. | |
| 2010/0144367 A1 | 6/2010 | Goh et al. | |
| 2010/0167722 A1 | 7/2010 | Madhavan et al. | |
| 2010/0261449 A1 | 10/2010 | Mishkin | |
| 2010/0312612 A1 | 12/2010 | Carr et al. | |
| 2011/0184961 A1 | 7/2011 | Aertebjerg et al. | |
| 2011/0212721 A1 | 9/2011 | Chang et al. | |
| 2011/0295577 A1 | 12/2011 | Ramachandran | |
| 2012/0115505 A1 | 5/2012 | Miyake et al. | |
| 2012/0163225 A1 | 6/2012 | Mishkin et al. | |
| 2012/0178413 A1 | 7/2012 | Schliesser et al. | |
| 2012/0178415 A1 | 7/2012 | Ch'ng et al. | |
| 2012/0221232 A1 | 8/2012 | Shang et al. | |
| 2012/0231781 A1* | 9/2012 | Kumar | G06Q 30/0201 |
| | | | 455/422.1 |
| 2012/0270561 A1 | 10/2012 | Giustina et al. | |
| 2012/0284080 A1 | 11/2012 | De Oliveira et al. | |
| 2012/0303413 A1 | 11/2012 | Wang et al. | |
| 2013/0053055 A1 | 2/2013 | Kumar | |
| 2013/0095817 A1 | 4/2013 | Karla et al. | |
| 2013/0095880 A1 | 4/2013 | Tzamaloukas | |
| 2013/0183996 A1 | 7/2013 | Scarr et al. | |
| 2014/0128058 A1 | 5/2014 | Ji et al. | |
| 2014/0192676 A1 | 7/2014 | Sullivan | |
| 2014/0211785 A1* | 7/2014 | Majd | H04L 12/2856 |
| | | | 370/352 |
| 2015/0004999 A1* | 1/2015 | Schuler | H04W 64/00 |
| | | | 455/456.1 |
| 2015/0319605 A1 | 11/2015 | Gupta et al. | H04W 8/18 |

FOREIGN PATENT DOCUMENTS

| | | |
|---|---|---|
| EP | 2431155 A1 | 3/2012 |
| EP | 2432155 | 3/2012 |
| EP | 2521288 | 7/2012 |
| WO | 9723085 | 6/1997 |

OTHER PUBLICATIONS

Notice of Allowance dated Jul. 26, 2016, received for U.S. Appl. No. 14/266,082.
List of IBM Patents or Applications Treated as Related.
Final Office Action dated Apr. 8, 2016, received for U.S. Appl. No. 14/230,044.
Non-Final Office Action dated Mar. 28, 2016, received for U.S. Appl. No. 14/266,082.
Non-Final Office Action dated May 6, 2015, received for U.S. Appl. No. 15/086,219.
Non-Final Office Action dated Aug. 31, 2015, received for U.S. Appl. No. 14/230,044.
Non-Final Office Action dated Sep. 25, 2015, received for U.S. Appl. No. 14/258,598.
Zhang, H., et al., "Change Point Detection Based on Call Detail Records," ISI 2009, Jun. 2009, pp. 55-60, 978-1-4244-4173-0/09/ $25.00, Copyright 2009 IEEE.
Kavulya, S., et al., "Draco: Top Down Statistical Diagnosis of Large-Scale VoIP Networks," Apr. 2011, Parallel Dada Laboratory, Carnegie Mellon University, AT&T Lab—Research, CMU-PDL-11-109.
Wang, H., et al., "Transportation Mode Interference from Anonymized and Aggregated Mobile Phone Call Detail Records," Intelligent Transportation Systems (ITSC), 2010 13th International IEEE Conference on Digital Object Identifier: 10/1109/ITSC.2010. 5625188, Publication Year 2010, pp. 318-323.
Hohwald, H., et al., "User Modeling for Telecommunication Applications: Experiences and Practical Implications," User Modeling, Adaption and Personalization, Proceedings 18th International Conference, Digital Object Identifier: 10.1007/978-3-642-13470-8_30, Jun. 20-24, 2010, pp. 327-338.
Fiadino, P., et al., "Steps towards the Extraction of Vehicular Mobility Patterns from 3G Signaling Data," TMA 2012, LNCS 7189, Mar. 2012, pp. 66-80, copyright Springer-Verlag Berlin Heidelberg 2012.
Tzavidas, S., et al., "Channel Measurement-Based Backup of Control Information in Distributed Cellular Architectures." Aug. 17, 2005, pp. 1-5, IPCOM000127010D, Copyright Motorola, Inc. Aug. 17, 2005.

\* cited by examiner

| | Source Addr | Dest Addr | Duration | Call Vol | Term Code | ... | Src Cell Site ID | Dest Cell Site ID | SGSN ID | GGSN ID | CDR ID | Time Stamp |
|---|---|---|---|---|---|---|---|---|---|---|---|---|
| 202 → | UE_1 | UE_A | Dur_1 | Vol_1 | N/A | ... | BS_1 | BS_A | SGSN_1 | GGSN_1 | CDR_1 | TS_1 |
| 204 → | UE_2 | UE_B | Dur_2 | Vol_2 | N/A | ... | BS_2 | BS_B | SGSN_1 | GGSN_1 | CDR_2 | TS_2 |
| | ... | ... | ... | ... | ... | ... | ... | ... | ... | ... | ... | ... |
| 206 → | UE_N | UE_Y | Dur_N | Vol_N | Code_N | ... | BS_N | BS_C | SGSN_N | GGSN_N | CDR_N | TS_N |

FIG. 2

| Segment ID | Starting Lat/Long | Ending Lat/Long | Dir. Information | Road Type | No. Of Lanes | |
|---|---|---|---|---|---|---|
| RS_1 312 | Lat_A/Long_A 314 | Lat_C/Long_C 316 | 2-way 318 | Freeway 320 | 4 322 | ... |
| RS_2 | Lat_D/Long_D | Lat_F/Long_F | 2-way | Freeway | 4 | ... |
| RS_3 | Lat_J/Long_J | Lat_L/Long_L | 1-way | Service | 1 | ... |
| RS_4 | Lat_N/Long_N | Lat_P/Long_P | 2-way | Toll | 4 | ... |
| ... | ... | ... | ... | ... | ... | ... |
| RS_N | Lat_Y/Long_Y | Lat_Z/Long_Z | 2-way | Residential | 2 | ... |

| User_ID | Road Segments | Base Stations | Date | Time | CDRs | ... |
|---|---|---|---|---|---|---|
| User_1 510 | RS_1 512 | BS_1, BS_2, BS_3 514 | Date_1 516 | Time_1 to Time_2 518 | CDR_1, CDR_2, CDR_3 520 | ... |
| User_2 | RS_2 | BS_4, BS_5, BS_7 | Date_1 | Time_1 to Time_4 | CDR_4, CDR_5 | ... |
| User_3 | RS_3 | BS_4, BS_5, BS_6 | Date_2 | Time_2 to Time_6 | CDR_6, CDR_7, CDR_8 | ... |
| ... | ... | ... | ... | ... | ... | ... |
| User_N | RS_M...RS_Z | BS_M, BS_N | Date_N | Time_M to Time_Z | CDR_M... CDR_Z | ... |

FIG. 5

CORRELATING ROAD NETWORK INFORMATION AND USER MOBILITY INFORMATION FOR WIRELESS COMMUNICATION NETWORK PLANNING

BACKGROUND

The present invention generally relates to wireless communication networks, and more particularly relates to utilizing road network information and user mobility for network planning.

Network planning is an important aspect of cellular network deployment. One goal of network planning is to enhance the experience of the users who heavily access the network while on the move (mobile users). However, providing seamless connectivity to mobile users is challenging since users switch base stations frequently, and connectivity has to be maintained along the path of travel.

BRIEF SUMMARY

In one embodiment, a method for monitoring user mobility in a wireless communication network is disclosed. The method comprises analyzing a set of temporally related call detail records associated with at least one user of a wireless communication network. A set of base stations accessed during at least one call associated with the set of temporally related call detail records is identified based on the analysis of the records. At least one road segment of a road network within a threshold distance to each of the set of base stations is identified. A set of mobility information for the at least one user indicating that the at least one user traversed the at least one road segment is stored based on identifying the at least one road segment.

In another embodiment, a computer program storage product for monitoring user mobility in a wireless communication network is disclosed. The computer program storage product comprising instructions configured to perform a method. The method comprises analyzing a set of temporally related call detail records associated with at least one user of a wireless communication network. A set of base stations accessed during at least one call associated with the set of temporally related call detail records is identified based on the analysis of the records. At least one road segment of a road network within a threshold distance to each of the set of base stations is identified. A set of mobility information for the at least one user indicating that the at least one user traversed the at least one road segment is stored based on identifying the at least one road segment.

In another embodiment, an information processing system for monitoring user mobility in a wireless communication network is disclosed. The information processing system comprises a memory and a processor that is communicatively coupled to the memory. A network monitoring system is communicatively coupled to the memory and the processor. The network monitoring system is configured to perform a method. The method comprises analyzing a set of temporally related call detail records associated with at least one user of a wireless communication network. A set of base stations accessed during at least one call associated with the set of temporally related call detail records is identified based on the analysis of the records. At least one road segment of a road network within a threshold distance to each of the set of base stations is identified. A set of mobility information for the at least one user indicating that the at least one user traversed the at least one road segment is stored based on identifying the at least one road segment.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 illustrates one example of call detail records according to one embodiment of the present invention;

FIG. 3 illustrates one example of road-network information according to one embodiment of the present invention;

FIG. 5 illustrates one example of mobility information according to one embodiment of the present invention;

DETAILED DESCRIPTION

Figure 1:
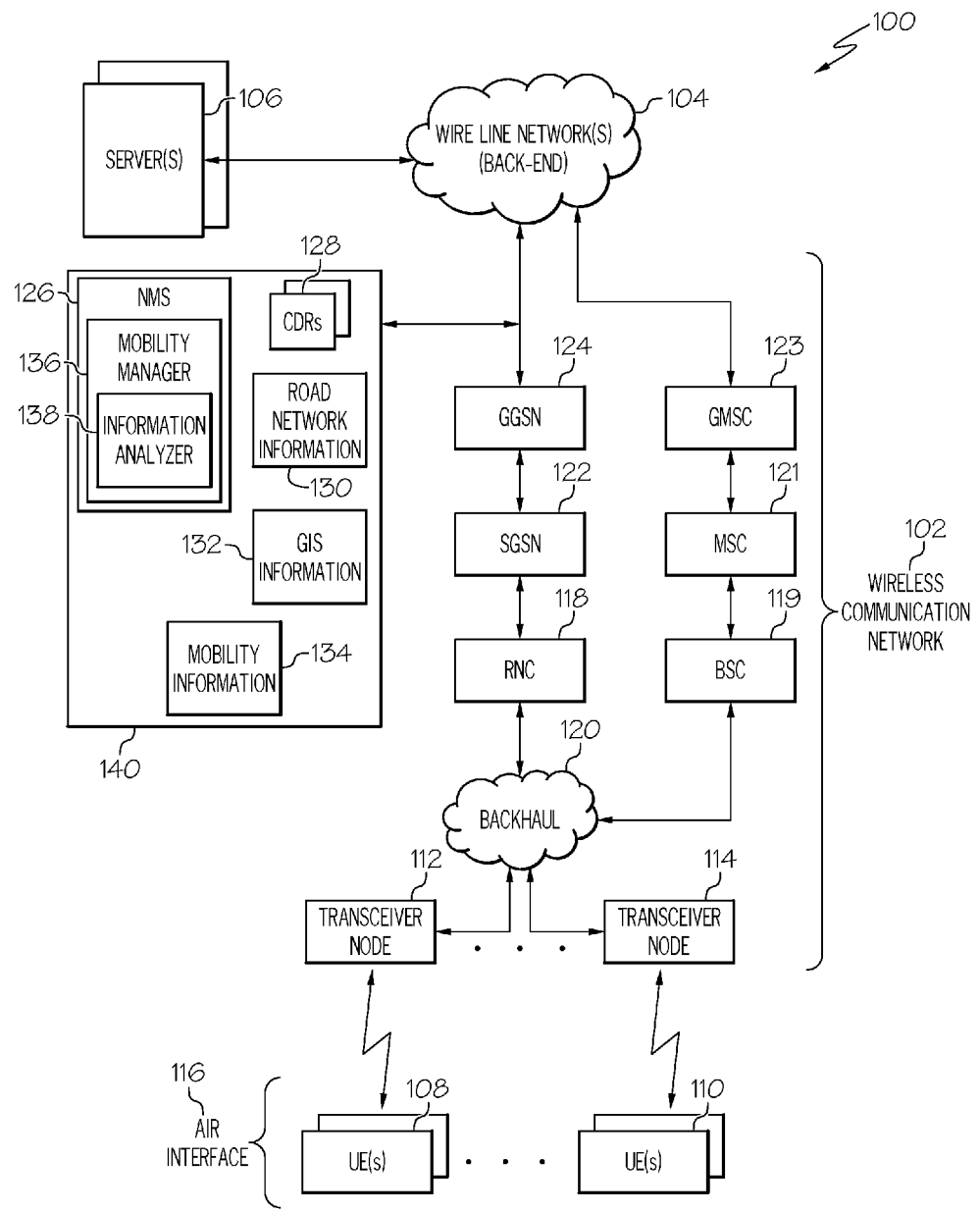
FIG. 1 is a block diagram illustrating one example of an operating environment according to one embodiment of the present invention.

FIG. 1 shows an operating environment 100 according to one embodiment of the present invention. The operating environment 100 comprises one or more wireless communication networks 102 that are communicatively coupled to one or more wire line networks 104. For purposes of simplicity, only the portions of these networks that are relevant to embodiments of the present invention are described. The wire line network 104 acts as a back-end for the wireless communication network 102. In this embodiment, the wire line network 104 comprises one or more access/core networks of the wireless communication network 102 and one or more Internet Protocol (IP) networks such as the Internet. The wire line network 104 communicatively couples one or more servers 106 such as (but not limited to) content sources/providers to the wireless communication network 102. In further embodiments, the back-end is not a wire line network. For example, the back-end takes the form of a network of peers in which a mobile base station (e.g., eNode B in the case of GSM and its descendants) is itself used as a back-end network for other base stations.

The wireless communication network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication network 102 includes one or more networks based on such standards. For example, in one embodiment, the wireless communication network 102 comprises one or more of a Long Term Evolution (LTE) network, LTE Advanced (LTE-A) network, an Evolution Data Only (EV-DO) network, a GPRS network, a Universal Mobile Telecommunications System (UMTS) network, and the like.

FIG. 1 further shows that one or more user devices (also referred to herein as "user equipment (UE)") 108, 110 are communicatively coupled to the wireless communication network 102. The UE devices 108, 110, in this embodiment, are wireless communication devices such as two-way radios, cellular telephones, mobile phones, smartphones, two-way pagers, wireless messaging devices, laptop computers, tablet computers, desktop computers, personal digital assistants, and other similar devices. UE devices 108, 110 access the wireless communication network 102 through one or more transceiver nodes 112, 114 using one or more air interfaces 116 established between the UE devices 108, 110 and the transceiver node 112, 114.

In another embodiment, one or more UE devices 108, 110 access the wireless communication network 102 via a wired network and/or a non-cellular wireless network such as, but not limited to, a Wireless Fidelity (WiFi) network. For example, the UE devices 108, 110 can be communicatively coupled to one or more gateway devices via wired and/or wireless mechanisms that communicatively couples the UE devices 108, 110 to the wireless communication network 102. This gateway device(s), in this embodiment, communicates with the wireless communication network 102 via wired and/or wireless communication mechanisms.

The UE devices 108, 110 interact with the wireless communication network 102 to send/receive voice and data communications to/from the wireless communication network 104. For example, the UE devices 108, 110 are able to wirelessly request and receive content (e.g., audio, video, text, web pages, etc.) from a provider, such as the server 106, through the wireless communication network 102. The requested content/service is delivered to the wireless communication network 102 through the wire line network 104.

A transceiver node 112, 114 is known as a base transceiver station (BTS), a Node B, and/or an Evolved Node B (eNode B) depending on the technology being implemented within the wireless communication network 104. Throughout this discussion a transceiver node 112, 114 is also referred to as a "base station" or a "cell site". The base station 112, 114 is communicatively coupled to one or more antennas and a radio network controller (RNC) 118 and/or base station controller (BSC) 119, which manages and controls one or more base station 112, 114. It should be noted that in a 4G LTE network, the eNodeB communicates directly with the core of the cellular network.

The RNC 118 and/or BSC 119 can be included within or separate from a base station 112, 114. The base stations 112, 114 communicate with the RNC 118 over a backhaul link 120. In the current example, a base station 112, 114 is communicatively coupled to a Serving GPRS (SGSN) 122, which supports several RNCs 118. The SGSN 122 is communicatively coupled to Gateway GPRS Support Node (GGSN) 124, which communicates with the operator's service network (not shown). The operator's service network connects to the Internet at a peering point. It should be noted that even though UMTS components are illustrated in FIG. 1 embodiments of the present invention are applicable to other wireless communication technologies as well.

In another example, the base stations 112, 114 communicate with the BSC 119 over the backhaul link 120. In this example, a base station 112, 114 is communicatively coupled to a mobile switching center (MSC) 121, which supports several BSCs 119. The MSC 121 performs the same functions as the SGSN 122 for voice traffic, as compared to packet switched data. The MSC 121 and SGSN 122 can be co-located. The MSC 121 is communicatively coupled to a gateway mobile switching center (GMSC) 123, which routes calls outside the mobile network.

In one example, the communication protocols between the UE devices 108, 110 and the GGSN 124 are various 3rd Generation Partnership Project (3GPP) protocols over which the internet protocol (IP) traffic from the UE devices 108, 110 is tunneled. For example, a GPRS tunneling protocol (GTP) is utilized between the RNC 118 and the GGSN 124. A standard Internet Protocol (IP) is utilized between the GGSN 124 and the wire line network 104. The server(s) 106 has a TCP (Transmission Control Protocol) socket that communicates with a TCP socket at the UE devices 108, 110 when a user wishes to access data from the server 106. An IP tunnel is created from the GGSN 124 to UE devices 108, 110 for user traffic and passes through the interim components, such as the RNC 118 and the SGSN 122.

A network monitoring system (NMS) 126 is implemented within or communicatively coupled to the wireless communication network 102. The NMS 126, in one embodiment, monitors user mobility within the network 102 and correlates user mobility information with road-network information for network planning. In this embodiment, the NMS 126 utilizes call detail records (CDRs) 128, road-network information 130, and geographic information system (GIS) data 132 to determine mobility (trajectory) information 134 of mobile users within the network 102. Mobility information 134 comprises, for example, data identifying specific road segments traveled by mobile users, data identifying the base stations associated with these road segments, and geographic location associated with the road segments and base stations. The mobility information 134, in some embodiments, also comprises data identifying the road segments that contribute load on specific base stations. Data identifying road segments that do not have wireless service coverage (or that have inadequate wireless service coverage) can also be included within the mobility information 134. Network operators can utilize the mobility information 134 for advanced network planning. For example, network operators can utilize the mobility information 134 to deploy new base stations in strategic locations, move base stations to appropriate locations, resolve areas with inadequate wireless service coverage, and/or the like.

The NMS 126, in one embodiment, comprises a mobility manager 136. The mobility manager 136 includes an information analyzer 138. The NMS 126 and its components are discussed in greater detail below. In one embodiment, the NMS 126 is located in one or more servers 140 within or communicatively coupled to the network 102. In other embodiments, the NMS 126 (or at least one of its components) resides at the source of the CDRs 128 (e.g., the MSC 121 and/or the SGSN 122). The server 140, in one embodiment, is a datacenter that receives CDRs 128 from a network element such as the MSC 121 and/or the SGSN 122 for billing purposes. The server 140, in on embodiment, stores CDRs 128 for a given period of time. Stated differently, the server 138 stores and maintains historical CDR data for a given amount of time. In addition to CDR data, the server

140 can also include other information such as records of user addresses, user billing plans, etc.

As discussed above, providing seamless connectivity to mobile users is challenging since users switch base stations frequently, and connectivity has to be maintained along the path of travel. However, one or more embodiments utilize a combination of CDRs, road-network information, and GIS information to identify mobility (trajectory) information of mobile users within the wireless communication network. Based on this mobility information, network operators are able to determine network optimizations. For example, network operators can determine how to optimally place or upgrade base stations based on identifying the road segments where their mobile users access the most data.

In one embodiment, the NMS 126 obtains a plurality of call detail records 128 (also referred to as "charging data records" or "call data records") generated by, for example, the MSC 121 and/or the SGSN 122. The NMS 126, in one embodiment, is configured to obtain CDRs 128 at predefined intervals. However, the NMS 126 can also obtain CDRs 128 as they are generated. A CDR 128 is a formatted measure of a UE's service usage information (placing a phone call, accessing the Internet, etc.). For example, a CDR 128 includes information related to a telephone voice or data call such as (but not limited to) the origination and destination addresses of the call; the time the call started and ended; the duration of the call; the time of day the call was made; call termination and error codes; and other details of the call. A CDR 128 also comprises some (partial) information about which network elements handled the particular call including, but not limited to, source cell site identifiers and destination cell site identifiers. A CDR 128 is typically generated by one or more network functions that supervise, monitor, and/or control network access for the device, such as the MSC 121 for voice calls and the SGSN 122 for data calls.

FIG. 2 shows various examples of CDR records. In the example of FIG. 2 each row 202, 204, 206 corresponds to a separate CDR. In this example, each CDR 202, 204, 206 comprises entries identifying flow information such as (but not limited to) the source/origination address 208 of the call; the destination address 210 of the call; temporal information 212 (e.g., duration, start and end times, etc.) associated with the call; the data volume 214 of the call; and call termination and error codes 216. Each CDR 202, 204, 206 also comprises entries comprising partial network information such as (but not limited to) a source cell site identifier (ID) 218; and a destination cell site ID 220; the ID 222 of the SGSN that handled the call; and the ID 224 of the GGSN that handled the call.

FIG. 2 also shows that a CDR can comprise information specific to the CDR itself such as (but not limited to) an ID 226 uniquely identifying the CDR and a time stamp 228 identifying when the CDR was generated. It should be noted that another example of a CDR format is provided by the 3GPP specification 32.297 (see 3gpp.org/ftp/Specs/html-info/32297.htm), which is hereby incorporated by reference. It should be noted that a CDR, in one embodiment, can be an enriched CDR that comprises information associated with all the base stations to which a call was handed-off to while the call was active.

In addition to CDRs 128, the NMS 126 also obtains a set of road-network information 130. The road-network information 130 comprises data regarding roads and their connectivity. Examples of road-network information include (but are not limited to) the latitude and longitude of segments of roads, directional information (e.g., indication whether a road segment is one-way or two-way), road type (e.g., freeway, toll-road, service road, residential road, etc.) associated with a road segment, number of lanes associated with a road segment, etc. Road-network information 130 can be maintained at the server 140 and/or obtained from various external sources.

FIG. 3 shows one example of road-network information 330. In the example of FIG. 3 each row 302, 304, 306, 308, 310 corresponds to a different road segment. The road segments can be contiguous segments (i.e., portions) of the same road, non-contiguous segments of the same road, and/or segments of different roads. In this example, the road-network information 330 for each road segment comprises an entry 312 uniquely identifying the road segment; an entry 314 identifying the starting latitude and longitude coordinates of the road segment; an entry 316 identifying the ending latitude and longitude coordinates of the road segment; an entry 318 with directional information for the road segment; an entry 320 identifying the road type of the road segment; and an entry 322 identifying the number of lanes for the road segment. It should be noted that road-network information 130 is not limited to the examples shown in FIG. 3.

Figure 4:
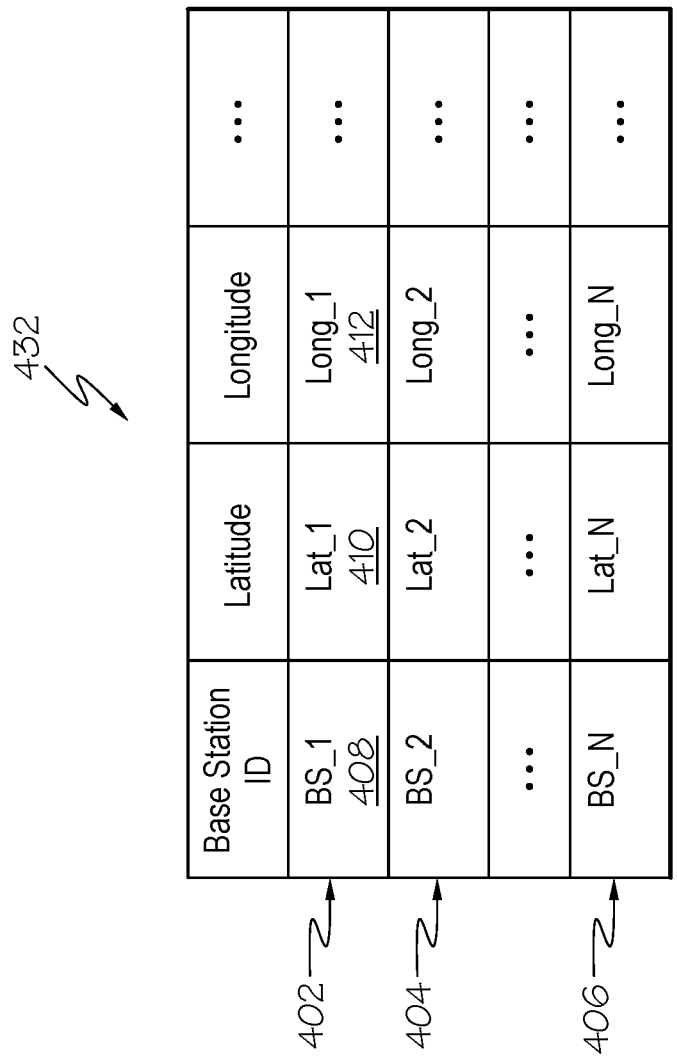
FIG. 4 illustrates one example of geographic information system data according to one embodiment of the present invention.

The NMS 126 also obtains GIS information 132 associated with base stations within the wireless communication network 102. GIS information comprises at least a unique identifier of a base station and geographical location information such as the latitude and longitude coordinates of the base station. FIG. 4 shows one example of GIS information 432. In the example of FIG. 4 each row 402, 404, 406, corresponds to GIS information for different base station. In this example, the GIS information for each base station comprises an entry 408 uniquely identifying the base station; an entry 410 identifying the latitude coordinate of the base station; and an entry 412 identifying the longitude coordinate of the base station. In addition service area coverage information such as (but not limited) to range of coverage provided by a given base station can also be included within the GIS information. It should also be noted that GIS information 132 is not limited to the examples shown in FIG. 4.

The mobility manager 136 of the NMS 126 utilizes information from the CDRs 128, road-network data 130, and GIS data 132 to determine the mobility information 134 associated with mobile users within the network 102. In one embodiment, the mobility information 134 identifies the trajectories used by mobile users within the network 102. Stated differently, the mobility information 134 identifies the road segments traveled by the mobile users. In more detail, a trajectory, in one embodiment, is a sequence of geo-spatial points traversed during a call and optionally mapped onto the physical road/rail network (i.e. the points are corrected to lie on one of the road segments of the road network).]

In one embodiment, the information analyzer 138 of the mobility manager 136 analyzes the CDRs 128 and identifies a set of temporally related CDRs for a given mobile user. In this embodiment, temporally related CDRs are a sequence of CDRs generated within a threshold period of time. The information analyzer 138 identifies temporally related CDRs, for example, based on the time stamp associated with CDRs for the given mobile user. The information analyzer 138 then analyzes the temporally related CDRs and GIS data 132 to determine a base station location sequence associated with the mobile user for the period of time corresponding to the temporally related CDRs. This location sequence identifies the sequence of base stations accessed by the mobile user and the location of each accessed base station.

When determining the base station location sequence, the information analyzer 138 identifies each base station associated with the temporally related CDRs based on the base station (source cell site) identifier(s) within each of the CDRs. The sequence of the base stations identified from the related CDRs indicates the sequence of base stations accessed by the mobile user. For example, consider a set of temporally related CDRs comprising the following sequence of CDRs: CDR_1, CDR_2, and CDR_3. In this example, the information analyzer 138 identifies base station BS_1 from CDR_1, base station BS_2 from CDR_2, and base station BS_3 from CDR_3. Therefore, the base station access sequence associated with the mobile user for the set of temporally related CDRs comprising CDR_1, CDR_2, and CDR_3 is BS_1, BS_2, and BS_3.

Once the information analyzer 138 has identified one or more of the base stations accessed by the mobile user, the information analyzer 138 cross-references the identified base station(s) with the GIS data 132 to obtain the location information (e.g., latitude/longitude coordinates) of the base station(s). Stated differently, the information analyzer 138 searches the GIS data 132 for base station identifiers corresponding to the base station identifiers obtained from the temporally related CDRs. The location information in the GIS data 132 associated with the corresponding base station identifiers is designated as the location information for the base stations associated with the temporally related CDRs. The identified base stations and their location information are then stored as the base station location sequence for the set of temporally related CDRs.

Once the base station location sequence has been determined, the mobility manager 136 identifies one or more road segments traveled by the mobile user based on the location sequence. In this embodiment, the information analyzer 138 compares the set of location information from the base station location sequence to the road-network information 130, and identifies one or more road segments traveled by the mobile user. The set of location information from the base station location sequence comprises information such as a set of latitude/longitude coordinates for each base station in the sequence. For example, if the base station location sequence indicates that the mobile user accessed base stations BS_1, BS_2, and BS_3 the set location of information comprises the latitude/longitude coordinates Lat_1/Long_1 for BS_1, Lat_2/Long_2 for BS_2, and Lat_3/Long_3 for BS_3.

The information analyzer 138 analyzes the road-network information 130 to identify road segments (or portions thereof) with location information corresponding to the location information of the accessed base stations. In the current example, the information analyzer 138 analyzes the road-network information 130 to identify one or more road segments with location information corresponding to or matching the latitude/longitude coordinates for BS_1, the BS_2, and BS_3. It should be noted that the location information of the base stations is not required to be an exact match with the location information of a road segment. For example, although a base station is located at a given set of latitude/longitude coordinates it provides service coverage for a surrounding area within a given distance from the base station. The mobility manager 136, in one embodiment, is pre-configured with information identifying this given distance and/or identifies this distance information from a set of network inventory information provided by the network operator. Therefore, when analyzing the road-network information 130 to identify one or more road segments the information analyzer 138 identifies road segments with location information (e.g., latitude/longitude coordinates) at least within a threshold distance from the accessed base stations. In one embodiment, this threshold distance corresponds to a service area provided by a base station.

In the current example, the information analyzer 138 identifies one or more road segments from the road-network information 130 that are within at least a threshold distance from base stations BS_1, the BS_2, and BS_3. In this example, the information analyzer 138 determines that road segment RS_1 comprises location information (e.g., latitude and longitude coordinates) that is at least within a threshold distance from base stations BS_1, BS_2, and BS_3. Stated differently, the information analyzer 138 determines that the starting latitude/longitude coordinates "Lat_A/Long_A" and ending latitude/longitude coordinates Lat_C/Long_C of road segment RS_1 are within a threshold distance to each of the latitude and longitude coordinates of base stations BS_1, BS_2, and BS_3. The identified road segment(s) is then stored within the mobility information 134 and identified as the most likely path (i.e., user trajectory) that the mobile user traveled on a road network for a given instance of travel.

It should be noted that in situations where the temporally related CDRs only include a subset of base stations (e.g., originating and terminating base stations) the mobility manager 136 utilizes CDRs across multiple calls and days to identify a traveled road segments. It should also be noted that, in some embodiments, the road segments (or portions thereof) traveled by a user can also be identified based on user location information. In this embodiment, the mobility manager 136 obtains user location information based on global positioning system (GPS) updates sent from the UEs 108, base station triangulation, and/or the like. This user location information is then compared to the road-network information 130 and optionally the GIS information 132. Road segments (and optionally base stations) comprising location information matching the user location information within a given threshold are identified as the segments most likely traveled by the user. The identified road segment(s) is then stored within the mobility information 134 and identified as the most likely path that the mobile user traveled on a road network for a given instance of travel.

FIG. 5 shows one example of mobility information 534. In the example of FIG. 5, each row 502, 504, 506, 508 corresponds to a user trajectory for a given set of temporally related CDRs. It should be noted that a given user may have multiple user trajectory entries each being associated with a different set of temporally related CDRs. A user trajectory entry comprises, for example, a unique identifier 510 of the user associated with the user trajectory; a unique identifier 512 of the road segment(s) traveled by the user; a unique identifier 514 of each base station that was accessed during travel; and the date 516 and time 518 of travel. For example, FIG. 5 shows that User_1 traveled road segment RS_1 on Date_1 during the time interval of Time_1 to Time_N. FIG. 5 also shows that User_1 accessed base stations BS_1, BS_2, and BS_3 for this trajectory.

In one embodiment, the mobility information 134 can also comprise the unique identifier 520 of each temporally related CDR associated with a given user trajectory. For example, the mobility information 534 of FIG. 5 identifies the temporally related CDRs (CDR_1, CDR_2, and CDR_3) associated with user trajectory 502. In another embodiment, the mobility information 534 can also include data volume and/or call error information for a user trajectory. The data volume (not shown) indicates how much data was sent/received for a call(s) associated with a user trajectory. Call error information (now shown) comprises the error codes (call failure codes, termination codes, etc.) for the call(s) associated with a user trajectory. The data volume and error information are obtained from the CDRs associated with a user trajectory.

In addition to traveled road segments, the mobility manager 136 can also identify road segments (or portions thereof) with insufficient service coverage areas. In this embodiment, given a set of temporally related CDRs the mobility manager 136 analyzes the CDRs for any errors such as call failure or termination codes. For example, consider a set of temporally related CDRs comprising CD_A to CDR_G. The mobility manager 136 identifies that a service error (e.g., call failure or termination codes) exists in CDR_D. Therefore, the mobility manager 136 determines that the road segments (or portions thereof) associated with CDR_A, CDR_B, CDR_C, CDR_E, CDR_F, and CDR_G have sufficient base station coverage. The mobility manager 136 also determines that road segments or portions of a road segment associated with CDR_D fail to have sufficient base station coverage. The mobility manager 136 identifies these road segment(s) (or portion thereof) based on the road segment identification process discussed above.

It should be noted that if a CDR does not comprise sufficient information to identify the road segment the mobility manager 136 identifies the road segments for CDRs with successful connections generated prior to and a subsequent to the CDR(s) with a service failure. For example, if CDR_D does not have enough information to identify its associated road segment(s) the mobility manager 136 identifies the road segment(s) for at least CDR_C and CDR_E since they are each associated with successful calls. The mobility manager 136 can then analyze the road-network information 130 to identify the road segment(s) between the road segment(s) identified for CDR_C and CDR_E. This identified road segment(s) is then marked as the segment associated with CDR_3. The road segments identified for CDR_C, CDR_D, and CDR_E are then stored within the mobility information 134 and identified as the most likely path that the mobile user traveled on a road network for a given instance of travel.

In another embodiment, the duration of a dropped call can also be used to estimate the location of poor coverage areas. For example, a typical behavior of a cellular user is to retry a call if the call fails. The duration between a dropped call associated with a pair of numbers and the next success of the call between the same numbers indicates the amount of time the cellular coverage was not available. Using the location information, and the approximate speed on the road segments the user is in, along with the duration of the dropped call, the mobility manager 136 can identify where the coverage is insufficient.

The mobility manager 136, in one embodiment, utilizes the mobility information 134 to provide network operators with various types of network-related information. In one example, the mobility manager 134 uses the mobility information 134 to determine a data access density for each road segment based on the number of users who traveled that road segment. Stated differently, the mobility information 134 determines how much data was accessed per user on a given road segment. The data access density can be calculated from the call volume data within the mobility information 134 or CDRs. The data access density can be calculated at different granularities including, but not limited to, data access per hour, day, week, month, and/or the like. It should be noted that the calculated data access density can also be in terms of the total amount of data transmitted on a given road segment.

Figure 6:
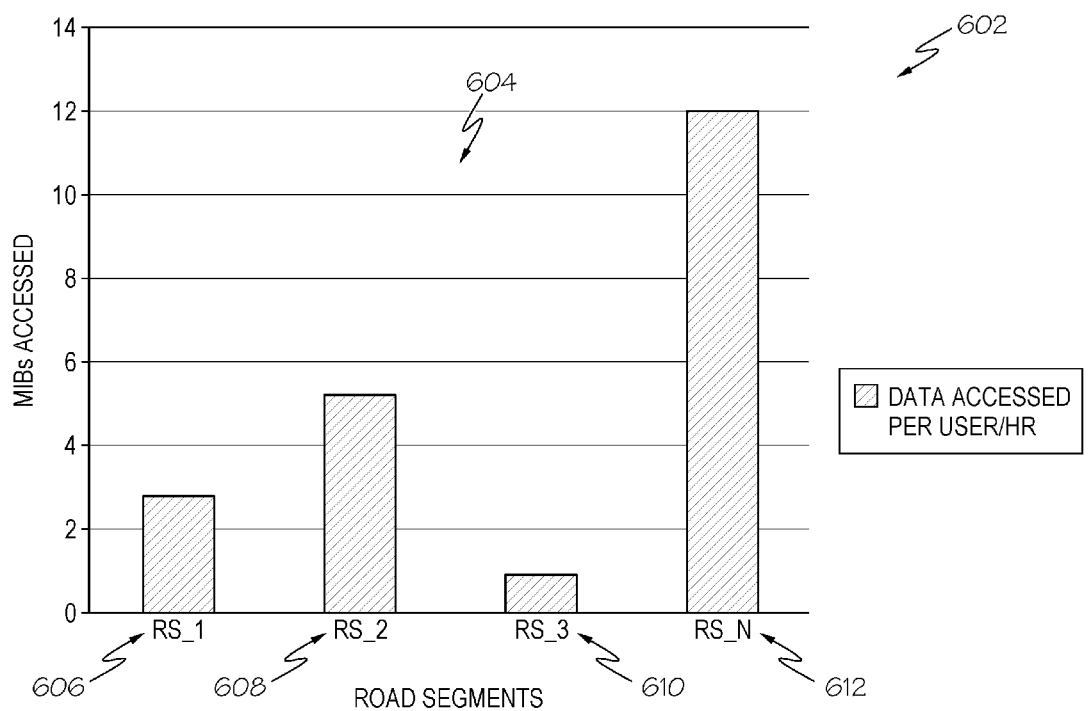
FIG. 6 shows one example of a road-network density map according to one embodiment of the present invention.
Figure 7:
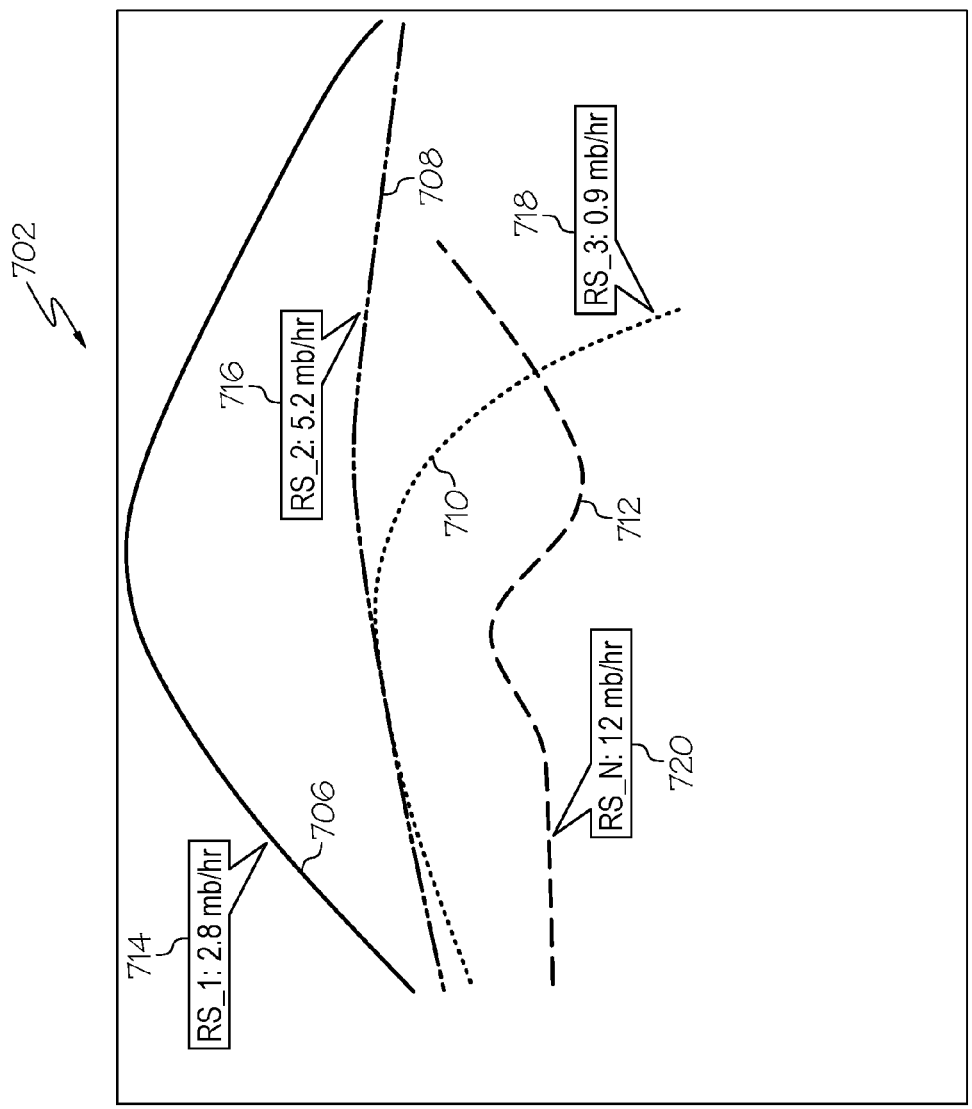
FIG. 7 shows one example of a road-network density map according to one embodiment of the present invention.

A graph/map of the data access density information is generated by the mobility manager 136. This graph/map is referred to as a road-network density map. For example, FIG. 6 shows one example of a road-network density map 602 displaying data access information 604 for one or more road segments 606, 608, 610, 612 on hourly basis. FIG. 7 shows another example of a road-network density map 702 in which the road segments 706, 708, 710, 712 are graphically displayed on a map 702 at their respective geographical locations. FIG. 7 also shows that the data access information 714, 716, 718, 720 calculated for each road segment 706, 708, 710, 712 is also displayed on the map 702. In the example of FIG. 7, the calculated data access information 706, 708, 710, 712 is displayed next to the road segment 706, 708, 710, 712 in text form. However, other visual indicators can be used as well. For example, the road segments can be highlighted using one or more colors that represent the data access information, where different colors represent different data access densities. It should be noted that other visual indicators are applicable as well.

In addition to the data access density information, the mobility manager 136 also calculates how much each road segment contributed towards a load on its respective base station(s). This load contribution information can be calculated based on the data access density information. For example, the load contributed by a particular road segment is calculated as the summation of bytes contributed by each user when on that road segment in any considered interval of time. The load contribution information can be calculated at different granularities including, but not limited to, load per hour, day, week, month, and/or the like. The mobility manager 136, in one embodiment, generates a graph/map presenting the load contribution information to a user. This graph/map is referred to as a base-station-road information map. Examples of the base-station-road information map are similar to the road-network density maps shown in FIGS. 6 and 7. However, instead of showing data access density information these graphs/maps would show load contribution information for each road segment.

Figure 8:
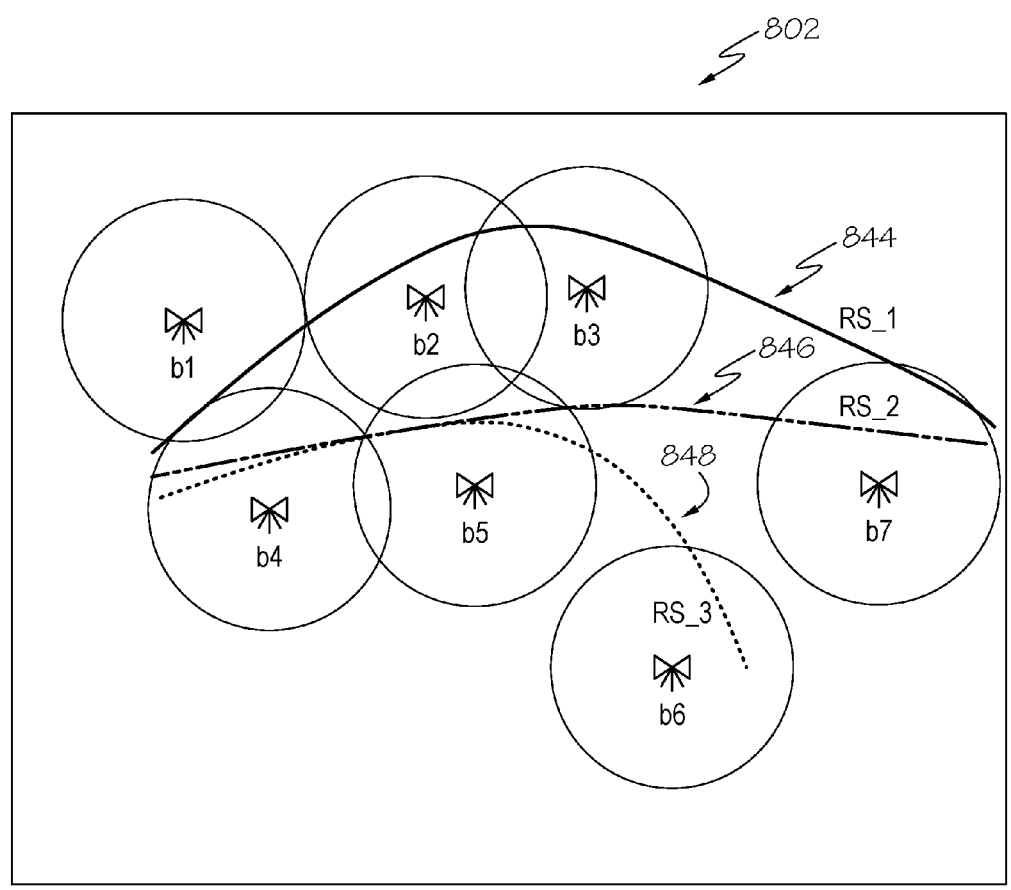
FIG. 8 shows one example of a road-network density map overlaid with base station location and coverage according to one embodiment of the present invention.

Network operators can utilize the road-network density and load contribution maps for various network planning/managing operations such as allocation of new base stations, base station placement, network upgrades, and/or the like; mark the most-likely location of subscriber at any given time (spatio-temporal signature of a subscriber's locations); identify back-bone routes that a particular subscriber uses for commuting based on CDR information, base station location information, and other supporting information such as signal strength profiles from multiple base stations at a given location; map-matching using cellular locations or approximate backbone routes; analyze network performance in spatial regions where subscribers reside or commute; and assign connectivity importance for a given road based on collectively analyzing all subscriber hangouts and transit routes For example, based on the road-network density map a network operator can identify the road segments with the highest data access densities and decide to move existing base stations closer to these road segments. In another example, the road-network density map can be overlaid with base station location and coverage information as shown in FIG. 8. For example, the map 802 of FIG. 8 graphically displays one or more road segments 806, 808, 810, 812 identified in the mobility information 134 at their respective geographic location. The map 802 further graphically displays each of the base stations 816, 818, 820, 822, 824, 826, 828 identified in the mobility information at their respective geographic location. In one embodiment, each of the base stations 816, 818, 820, 822, 824, 826, 828 are surrounded by a circle (or other indicator) 830, 832, 834, 836, 838, 840, 842 representing the coverage area of the base station.

The network operator utilizes the map 802 shown in FIG. 8 to identify the road segments (or portions thereof) with and without sufficient service coverage. For example, the road segment coverage map 802 of FIG. 8 shows that at least one portion 844, 846, 848 of each of the displayed road segments RS_1, RS_2, and RS_3 fail to be within the coverage area of at least one base station. In some embodiments, the mobility manager 134 highlights these road segment portions by, for example, visually changing the portion to indicate that it is not within a coverage area of at least one base station. Also, the road segment coverage map 802 can annotate the road segments or surrounding areas to display the number of users who travel that segment (or portion thereof) for a given level of granularity (e.g., minute, hour, week, month, etc.)

Figure 9:
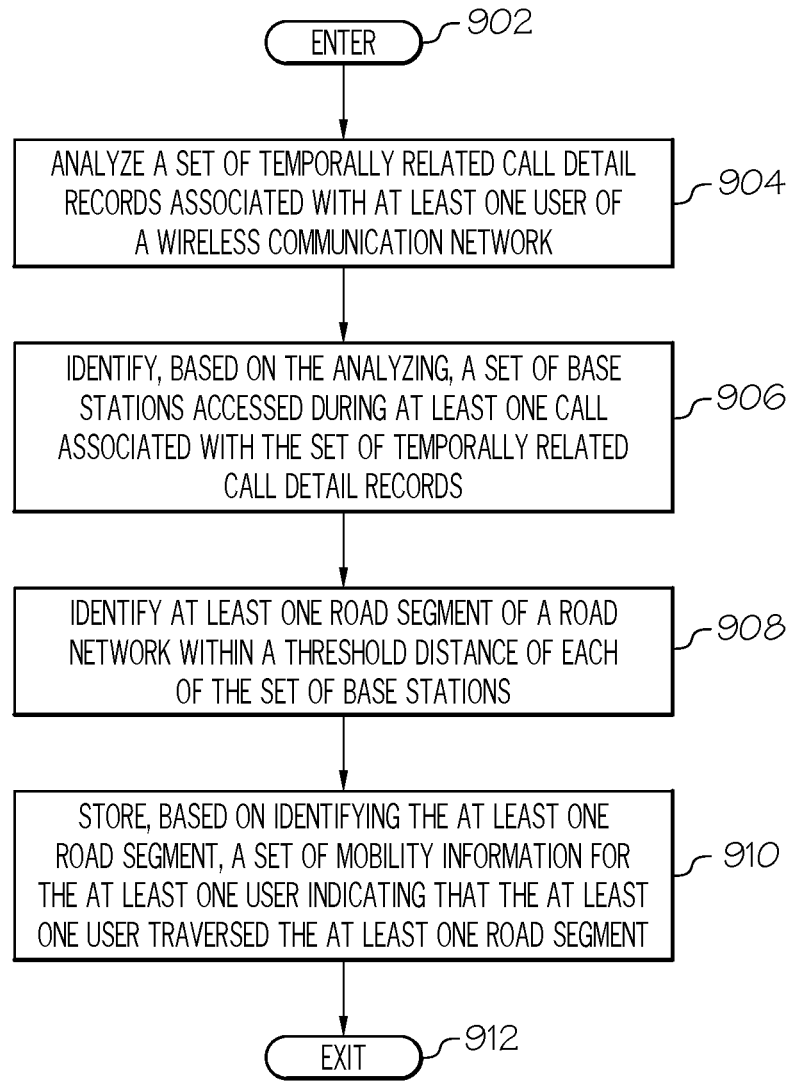
FIG. 9 is an operational flow diagram illustrating one example of monitoring user mobility in a wireless communication network according to one embodiment of the present invention.

FIG. 9 is an operational flow diagram illustrating one example of monitoring user mobility in a wireless communication network. The operational flow diagram of FIG. 9 begins at step 902 and flows directly to step 904. The NMS 126, at step 904, analyzes a set of temporally related call detail records associated with at least one user of a wireless communication network 102. The NMS 126, at step 906, identifies a set of base stations accessed during at least one call associated with the set of temporally related call detail records based on the analysis of the records. The NMS 126, at step 908, identifies at least one road segment of a road network within a threshold distance of each of the set of base stations. The NMS 126, at step 910, stores, based on identifying the at least one road segment, a set of mobility information for the at least one user indicating that the at least one user traversed the at least one road segment.

Figure 10:
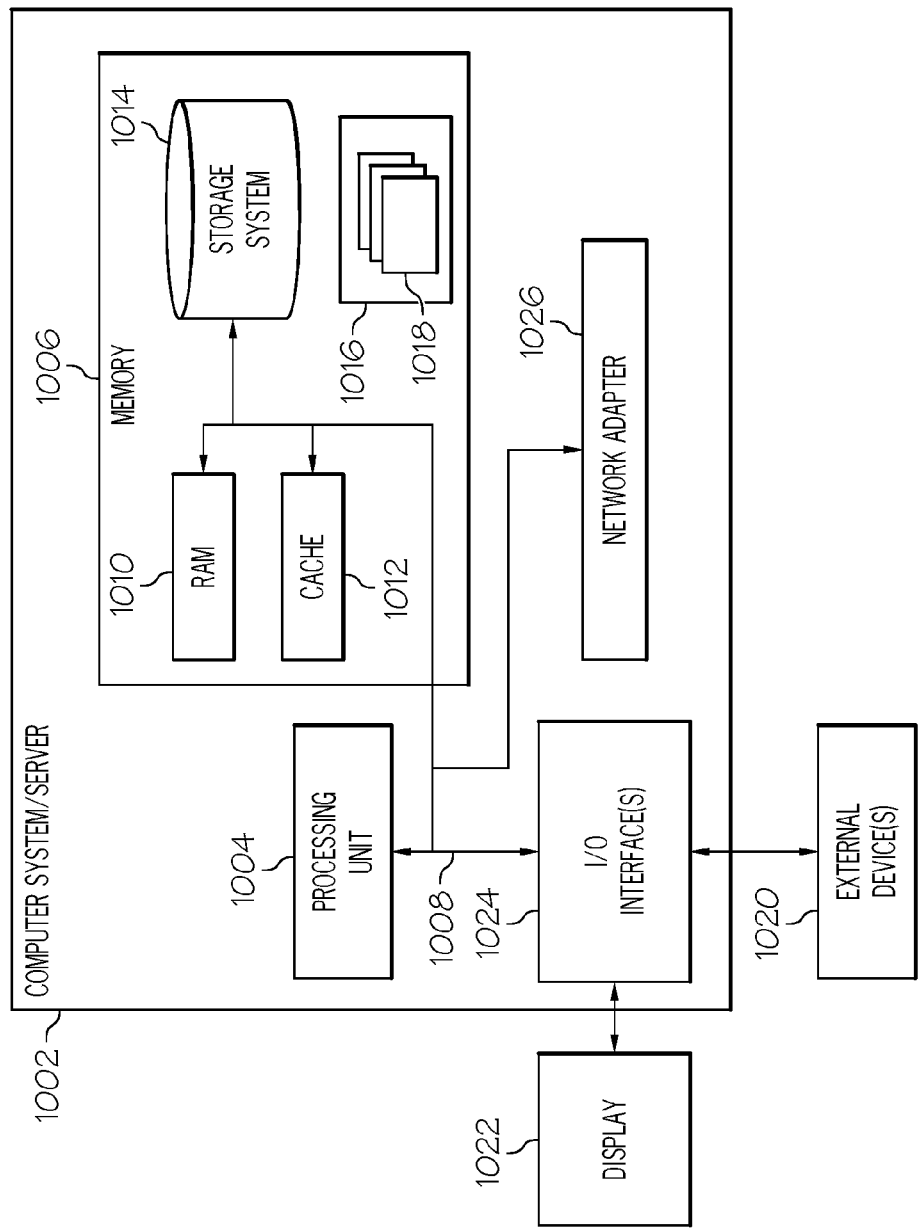
FIG. 10 is a block diagram illustrating one example of an information processing system according to one embodiment of the present invention.

Referring now to FIG. 10, this figure is a block diagram illustrating an information processing system that can be utilized in various embodiments of the present invention. The information processing system 1002 is based upon a suitably configured processing system configured to implement one or more embodiments of the present invention. Any suitably configured processing system can be used as the information processing system 1002 in embodiments of the present invention. The components of the information processing system 1002 can include, but are not limited to, one or more processors or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 10, the main memory 1006 includes at least the NMS 126 and its components shown in FIG. 1. Each of these components can reside within the processor 1004, or be a separate hardware component. The system memory 1006 can also include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of an embodiment of the present invention.

Program/utility 1016, having a set of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of embodiments of the present invention.

The information processing system 1002 can also communicate with one or more external devices 1020 such as a keyboard, a pointing device, a display 1022, etc.; one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium(s) may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, by an information processing system, for monitoring user mobility in a wireless communication network, the method comprising:

analyzing a set of temporally related call detail records associated with at least one user of a wireless communication network, wherein the set of temporally related call detail records comprises a sequence of call detail records generated within a threshold period of time;

identifying, based on the analyzing, a set of base stations accessed during at least one call associated with the set of temporally related call detail records;

identifying at least one road segment of a road network within a threshold distance to each base station of the set of base stations;

storing, by the information processing system and based on identifying the at least one road segment, a set of mobility information for the at least one user indicating that the at least one user traversed the at least one road segment;

identifying, based on the set of mobility information stored for the at least one user and a set of mobility information stored for a plurality of other users, a set of road segments in the road network travelled by each of the at least one user and the plurality of other users;

identifying, based on the set of mobility information stored for the at least one user and the set of mobility information stored for the plurality of other users, an amount of data accessed by each of the at least one user and the plurality of other users for each road segment of the set of road segments;

determining, based on the amount of data accessed by each of the at least one user and the plurality of other users for each road segment of the set of road segments, a load contributed by each road segment of the set of road segments on at least one base station providing service to each road segment of the set of road segments; and generating a map graphically displaying each road segment of the set of road segments and an indication of the load contributed by each road segment of the set of road segments on the least one base station.

2. The method of claim 1, wherein identifying the at least one road segment comprises:

determining a location associated with each base station of the set of base stations;

comparing the location associated with each base station of the set of base stations to a set of location information associated with a plurality of road segments of the road network; and determining, based on the comparing, that the at least one road segment is associated with a set of location information within the threshold distance to the location of each base station of the set of base stations.

3. The method of claim 1, wherein the threshold distance corresponds to a service area provided by the at least one base station of the set of base stations.

4. The method of claim 1, further comprising:

generating a map graphically displaying each road segment of the set of road segments and an indication of an amount of data accessed by users travelling on each of the road segments for a given interval of time.

5. The method of claim 1, further comprising:

identifying a set of base stations providing service to each road segment of the set of road segments;

identifying a service area provided by each base station of the set of base stations; and generating a map graphically displaying each road segment of the set of road segments and the service area provided by each base station of the set of base stations.

6. The method of claim 5, further comprising:

analyzing the map; and identifying at least a portion of one or more road segments of the set of road segments that fail to be within a service area of at least one of base station the set of base stations.

7. An information processing system for monitoring user mobility in a wireless communication network, the information processing system comprising:

a memory;

a processor communicatively coupled to the memory; and a network monitoring system communicatively coupled to the memory and the processor, wherein the network monitoring system is configured to perform a method comprising:

analyzing a set of temporally related call detail records associated with at least one user of a wireless communication network, wherein the set of temporally related call detail records comprises a sequence of call detail records generated within a threshold period of time;

identifying, based on the analyzing, a set of base stations accessed during at least one call associated with the set of temporally related call detail records;

identifying at least one road segment of a road network within a threshold distance to each base station of the set of base stations;

storing, by the information processing system and based on identifying the at least one road segment, a set of mobility information for the at least one user indicating that the at least one user traversed the at least one road segment;

identifying, based on the set of mobility information stored for the at least one user and a set of mobility information stored for a plurality of other users, a set of road segments in the road network travelled by each of the at least one user and the plurality of other users;

identifying, based on the set of mobility information stored for the at least one user and the set of mobility information stored for the plurality of other users, an amount of data accessed by each of the at least one user and the plurality of other users for each road segment of the set of road segments;

determining, based on the amount of data accessed by each of the at least one user and the plurality of other users for each road segment of the set of road segments, a load contributed by each road segment of the set of road segments on at least one base station providing service to each road segment of the set of road segments; and generating a map graphically displaying each road segment of the set of road segments and an indication of the load contributed by each road segment of the set of road segments on the least one base station.

8. The information processing system of claim 7, wherein identifying the at least one road segment comprises:

determining a location associated with each base station of the set of base stations;

comparing the location associated with each base station of the set of base stations to a set of location information associated with a plurality of road segments of the road network; and determining, based on the comparing, that the at least one road segment is associated with a set of location information within the threshold distance to the location of each base station of the set of base stations.

9. The information processing system of claim 7, wherein the method further comprises:

generating a map graphically displaying each road segment of the set of road segments and an indication of an amount of data accessed by users travelling on each of the road segments for a given interval of time.

10. The information processing system of claim 7, wherein the method further comprises:

identifying a set of base stations providing service to each road segment of the set of road segments;

identifying a service area provided by each base station of the set of base stations; and generating a map graphically displaying each road segment of the set of road segments and the service area provided by each base station of the set of base stations.

11. The information processing system of claim 10, wherein the method further comprises:

analyzing the map; and identifying at least a portion of one or more of the set road segments of road segments that fail to be within a service area of at least one base station of the set of base stations.

12. A computer program product for monitoring user mobility in a wireless communication network, the computer program storage product comprising a non-transitory computer readable medium having instructions embodied therewith, the program instructions executable by an information processing system to cause the information processing system to perform a method comprising:

analyzing a set of temporally related call detail records associated with at least one user of a wireless communication network, wherein the set of temporally related call detail records comprises a sequence of call detail records generated within a threshold period of time;

identifying, based on the analyzing, a set of base stations accessed during at least one call associated with the set of temporally related call detail records;

identifying at least one road segment of a road network within a threshold distance to each base station of the set of base stations;

storing, based on identifying the at least one road segment, a set of mobility information for the at least one user indicating that the at least one user traversed the at least one road segment;

identifying, based on the set of mobility information stored for the at least one user and a set of mobility information stored for a plurality of other users, a set of road segments in the road network travelled by each of the at least one user and the plurality of other users;

identifying, based on the set of mobility information stored for the at least one user and the set of mobility information stored for the plurality of other users, an amount of data accessed by each of the at least one user and the plurality of other users for each road segment of the set of road segments;

determining, based on the amount of data accessed by each of the at least one user and the plurality of other users for each road segment of the set of road segments, a load contributed by each road segment of the set of road segments on at least one base station providing service to each road segment of the set of road segments; and generating a map graphically displaying each road segment of the set of road segments and an indication of the load contributed by each road segment of the set of road segments on the least one base station.

13. The computer program product of claim 12, wherein identifying the at least one road segment comprises:

determining a location associated with each base station of the set of base stations;

comparing the location associated with each base station of the set of base stations to a set of location information associated with a plurality of road segments of the road network; and determining, based on the comparing, that the at least one road segment is associated with a set of location information within the threshold distance to the location of each base station of the set of base stations.

14. The computer program product of claim 12, wherein the threshold distance corresponds to a service area provided by the at least one base station of the set of base stations.

15. The computer program product of claim 12, wherein the method further comprises:

generating a map graphically displaying each road segment of the set of road segments and an indication of an amount of data accessed by users travelling on each of the road segments for a given interval of time.

16. The computer program product of claim 12, wherein the method further comprises:

identifying a set of base stations providing service to each road segment of the set of road segments;

identifying a service area provided by each base station of the set of base stations; and generating a map graphically displaying each road segment of the set of road segments and the service area provided by each base station of the set of base stations.

17. The computer program product of claim 16, wherein the method further comprises:

analyzing the map; and identifying at least a portion of one or more road segments of the set of road segments that fail to be within a service area of at least one base station of the set of base stations.

\* \* \* \* \*